United States Patent [19]

Day

[11] Patent Number: 5,098,213

[45] Date of Patent: Mar. 24, 1992

[54] STATIC BALL JOINT

[76] Inventor: Robert L. Day, 9990 Edmore Pl., Sun Valley, Calif. 91352

[21] Appl. No.: 709,200

[22] Filed: Jun. 3, 1991

Related U.S. Application Data

[63] Continuation-in-part of Ser. No. 656,003, Feb. 15, 1991, abandoned.

[51] Int. Cl.⁵ ............................................. B25G 3/00
[52] U.S. Cl. ........................................ 403/7; 403/90; 403/129; 403/137; 223/68
[58] Field of Search ............... 403/90, 129, 24, 115, 403/130, 137, 7; 223/68

[56] References Cited

U.S. PATENT DOCUMENTS

| | | | |
|---|---|---|---|
| 2,928,686 | 3/1960 | Newkirk | 403/90 X |
| 3,265,257 | 8/1966 | Buonamici | 403/90 X |
| 3,409,317 | 11/1968 | Richards | 403/90 X |
| 4,619,540 | 10/1986 | Day et al. | 403/24 |

Primary Examiner—Andrew V. Kundrat
Attorney, Agent, or Firm—Fred Flam

[57] ABSTRACT

A ball joint comprises companion inner and outer hollow ball sections each comprising a major segment of a sphere. Spring means within the ball sections urges a friction pad into engagement with the interior surface of one of the sections. Screws within the ball sections adjusts the spring force, the screws being accessible for movement through a series of openings in one of the ball sections.

6 Claims, 2 Drawing Sheets

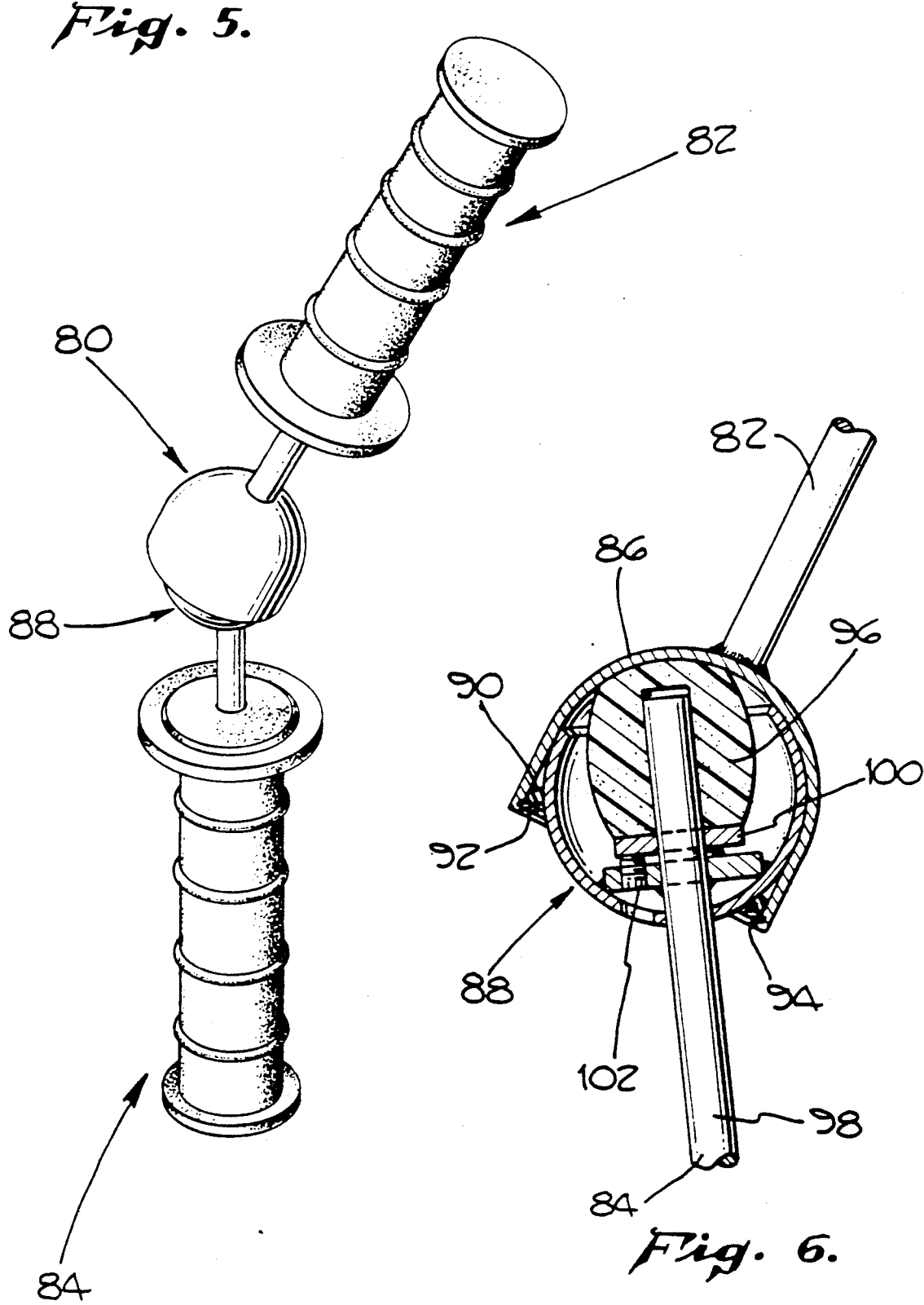

STATIC BALL JOINT

RELATED APPLICATION

This application is a continuation-in-part of my copending application Ser. No. 07/656,003 filed Feb. 15, 1991, now abandoned.

FIELD OF INVENTION

This invention relates to a universal ball joint that yieldingly opposes movement. Such a ball joint may be used for mounting an arm of an exerciser, for example, or for joining two arms to be held in an adjustable position, such as elements of a mannequin structure, or arms of a luminaire bracket.

OBJECTS OF THE INVENTION

The primary object of the present invention is to provide a simple ball joint capable of such functions in which the mechanism is neatly accommodated within a ball housing made of complementary ball parts.

SUMMARY OF INVENTION

I provide companion hollow ball elements that fit one within the other. One of the ball elements mounts a brake pad spring urged into contact with the companion ball element. In one form of the invention, the brake pad is itself elastomeric and provides the requisite spring force. In another form of the invention, a separate spring is provided. In both instances, a carriage is longitudinally movable for adjusting the spring force. Movement of the carriage is accomplished by a screw thread arrangement accessible for manipulation through access apertures in the corresponding ball element.

BRIEF DESCRIPTION OF THE DRAWINGS

A detailed description of the invention will be made with reference to the accompanying drawings wherein like numerals designate corresponding parts in the several figures. These drawings are true sacle.

FIG. 5 is a pictorial view of an exerciser comprising two arms connected together by ball joints incorporating another form of the present invention.

FIG. 6 is an enlarged longitudinal sectional view of the ball joint shown in FIG. 5.

DETAILED DESCRIPTION - PREFERRED EMBODIMENT

The following detailed description is of the best presently contemplated mode of carrying out the invention. This description is not to be taken in a limiting sense, but is made merely for purposes of illustrating the general principles of the invention, the scope of the invention being defined by the appended claims.

Structural and operational characteristics attributed to the form of the invention first described shall also be attributed to forms later described, unless such characteristcs are obviously inapplicable or unless specific exceptions are made.

Figure 1:
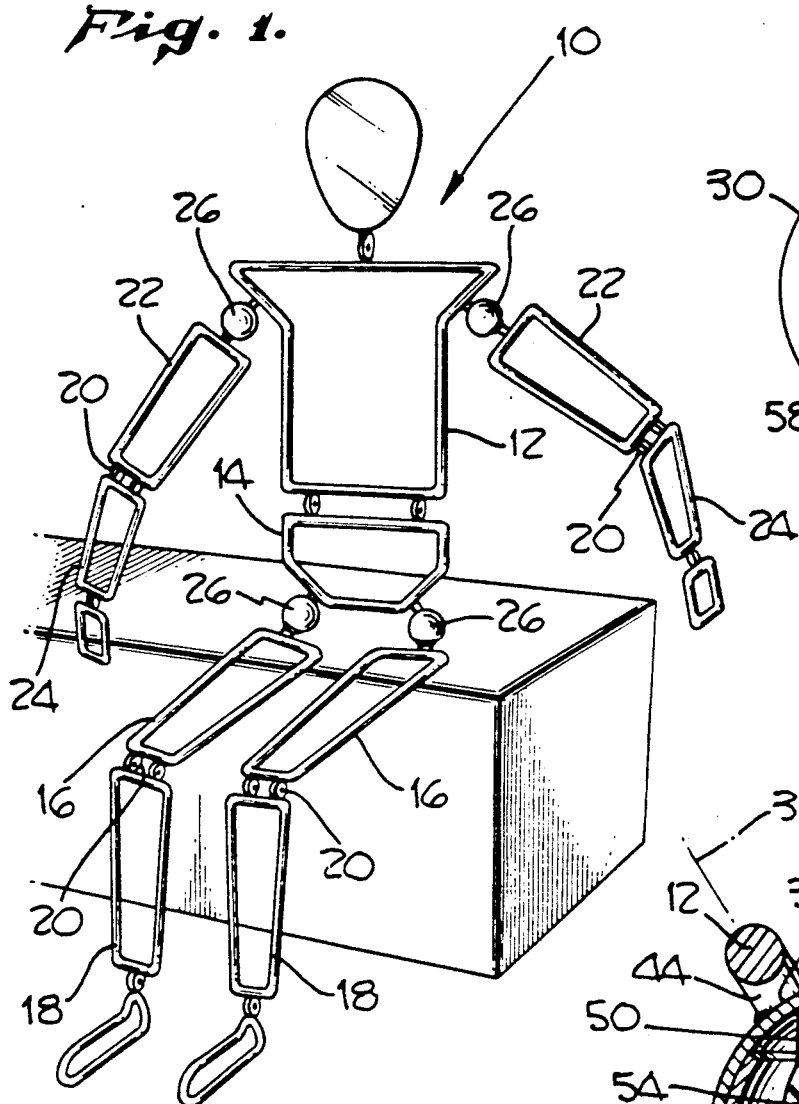
FIG. 1 is a pictorial view of a mannequin comprising a series of arms connected together by ball joints incorporating the present invention.
Figure 4:
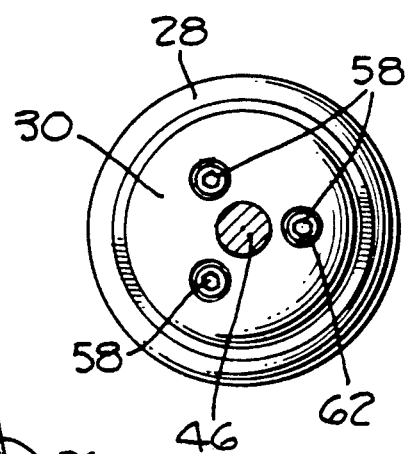
FIG. 4 is a transverse sectional taken along a plane corresponding to line 4—4 of FIG. 3.

The mannequin 10 shown in FIG. 1 comprises a torso section 12, a hip section 14, and four limbs. The lower limbs include upper leg sections 16 and lower leg sections 18 joined together by pivot joints 20. The upper limbs include upper arm sections 22 and lower arm sections 24 joined together by similar pivot joints 20. The pivot points 20 are of a type shown and described in U.S. Pat. No. 4,619,540 issued Oct. 28, 1986 to Robert L. Day and Robert H. Day entitled SPRING PIVOT FOR MANNEQUIN.

The pivot joints function adequately to simulate the usual simple pivot movements between the upper and lower arm sections and between the upper and lower leg sections; however, the pivot joints 20 do not provide the universal type movements for simulating the universal type movement of the joints between the arms and the torso section or between the legs and the hip section. Four ball joints 26 are provided for this purpose.

Figure 3:
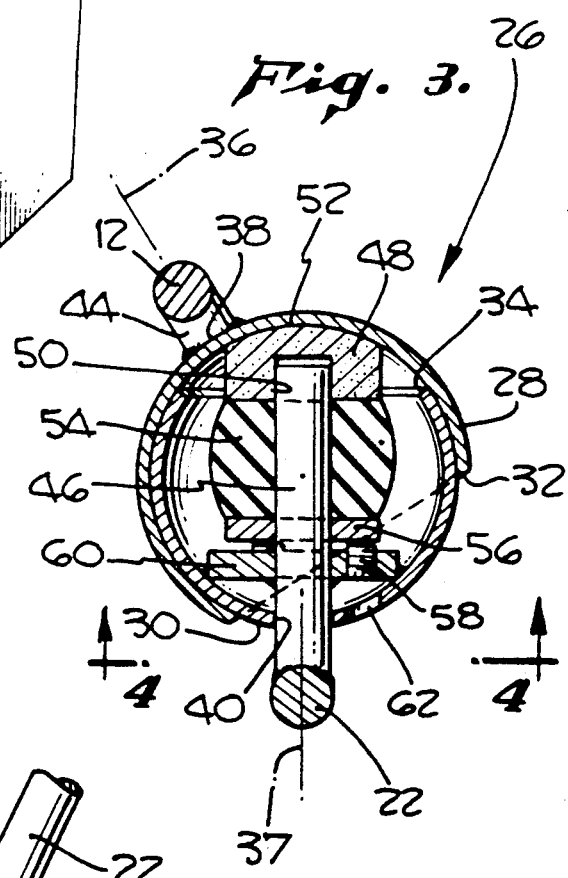
FIG. 3 is a longitudinal sectional view of the ball joint taken along a plane corresponding to line 3—3 of FIG. 2.
Figure 2:
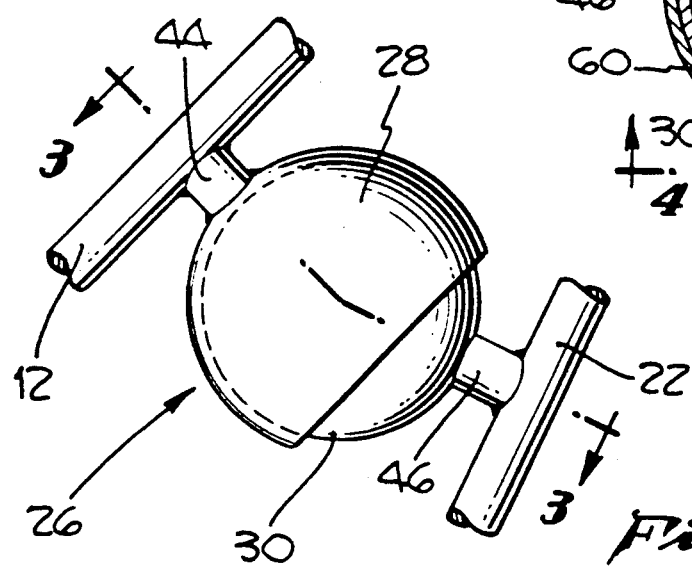
FIG. 2 is an enlarged elevational view showing one of the ball joints of the mannequin of FIG. 1.

All of the mechanisms of the ball joints 26 are contained within companion mating hollow ball sections 28 and 30 as shown in FIGS. 2 and 3. Both sections are made of metal. For bearing compatibility, the outer ball section 28 may be made of steel and the inner ball section 30 may be made of brass.

The outer ball section 28 comprises a major segment of a sphere temrinating at a circular opening 32 the diameter of which is somewhat less than the diameter of the sphere segment itself. The companion inner ball section 30 comprises a major segment of a sphere terminating at ag enerally circular opening 34 the diameter of which is somewhat less than the diameter of the sphere segment itself. The opening 34 exposes a minor segment of the interior surface of the outer ball section 28.

The ball section 28 has an axis 36 that passes through he center of the circular opening 32 and through the center 38 of the ball section. The ball section 30 has an axis 37 that passes through the center of its openings 34 and through the center of a small hole 40 at its base.

Since each of the ball sections is a major spherical segment, the ball sections cannot separate one from the other, however the sections are moved one with respect to the other.

The ball sections 28 is rigidly joined to the torso section 12 by a short stem or connector 44 extending from the center 38. Attachment may be by welding. The companion ball section is rigidly joined, as by welding, to a stem 46 that projects through the hole 40 and into the interior of the ball section 30. The outer end of the stem 46 is secured to the uppe arm section 22.

The ball sections 28 and 30 fit one inside the other and together mutually guide each other for limited universal movement so that the upper arm section 22 of the mannequin can assume various orientations relative to the torso section 12.

In order to hold the arm section 22 in an adjusted position, movement between the ball sections 28 and 30 is frictionally restrained. For this purpose, a friction pad 48 is provided. The pad 48 has a recess 50 that accommodates the end of the stem 46. The pad extends past the ball section opening 34 to engage the inner surface of the outer ball section 28. Preferably, the operative outer surface 52 of the pad is formed as a spherical segment to fit the ball section 28 thereby to maximize the area of contact between the pad and the ball section 28.

The pad 48 is urged into engagement by a spring 54. The spring is a solid cylindrical sleeve made of rubber, plastic or other suitable resilient compressible material. The bulk modulus of elasticity of the material is utilized to provide the spring force exerted on the pad 48. In the position illustrated, the spring 54 is compressed and is bulged laterally. The spring is mounted on the stem 46. One end of the spring engages the back surface of the friction pad 48. The other end of the spring engages or is attached to, a carriage or backing plate 56 slidably mounted on the stem. The carriage 56 is advanced to compress the spring by the aid of a series of equiangularly spaced socket screws 58. The screws 58 in turn are mounted on an interior plate 60 welded to the inside of the inner ball section 30.

A series of small access openings 62 allow insertion of a suitable tool or wrench for purposes of adjusting the screws 58. By such adjustment, the friction coefficient between the friction pad 48 and the outer ball section is adjusted. When the ball joint is used in a mannequin appliation, the screws 58 are initially adjusted, as at the factory, to provide the desired yielding restraint. After many repeated adjustments of the ball joints, readjustment may be necessary to restore the desired yeilding restraint.

In the mannequin application, the ball joint easily slips through the legs and sleeves of the garment displayed. No projections interfere, all of the mechanism being within the ball sections. The ball joint is capable of many other application in which elements are to be adjustably jointed together. Furthermore, the ball joint may be used as a static exerciser which, in contrast to weight or spring return exercisers, requires a combination of push and pull movements.

DETAILED DESCRIPTION OF SECOND EMBODIMENT

In the form of the invention shown in FIGS. 5 and 6, a ball joint 80 connects companion elements 82 and 84 of a static exerciser. The ball joint 80 comprises companion ball sections, an outer ball section 86 and an inner ball section 88. The outer ball segment is formed not as a major segment of a sphere as in the previous form, but as a hemisphere and a cylindrical extension thereof. The inner ball section 88 comprises a major segment of a sphere as in the previous form.

The inner ball section 88 is held or retained in nested or fitted relationship with the hemispherical part of the outer ball section 86 by the aid of an O-ring 90 retained by a snap ring 92 fitted in an internal groove 94 of the cylindrical extension of the outer ball section. The O-ring 90 is preferably slightly compressed when the parts are assembled. The O-ring may be made of Teflon or other material that imposes little or insignifcant frictional restraint upon universal movement of the ball sections.

Significant frictional restraint against relative movement of the ball sections is provided by a friction pad 96. The pad 96 is accommodated on the inwardly projecting end of an arm 98 of one of the exerciser elements 84.

In the present instance, the pad 96 is itself elastomeric thereby to provide spring force urging the pad into contact with the interior surface of the ball section 86. For this purpose, the pad may be made of material such as known commercially as UROFLEX ®, which is a flexible elastomeric polyurethane foam made by Basf Corporation of Troy, Mich. In its unstresses state, the pad 96 has a cylindrical configuration. When the ball joint is assembled, the pad 96 is axially compressed and bulged outwardly. The force of the spring pad 96 is exerted at one end on the interior surface of the ball section 86, and at the other end on the carriage or backing plate 100.

The backing plate 100 is identical to the carriage or backing plate 56 of the previous form. It is similarly slidably mounted on the stem or rod 98, and moved by the aid of adjusting screws 102. The backing plate 100, being attached to the inner ball section, transmits the reaction of the O-ring 90.

The outer diameter of the inner ball section 88 may very closely approximate the inner diameter of the outer ball section 86. Despite very close tolerances, the ball sections are actually out of contact; thus the reaction of the friction pad is absorbed entirely by the O-ring 90. The frictional restraint imposed may be varied through a wide range.

Intending to claim all novel, useful and unobvious features and combinations of features shown and/or described, I claim:

1. In a ball joint:
   a. an outer hollow ball section;
   b. an inner hollow ball section comprising a major segment of a sphere and confined within the outer ball section for relative movement therein about a common center;
   c. a friction device carried by, and located entirely within, one of said ball sections; said friction device including a friction pad;
   d. means confining said friction pad for movement in a path towards and away from an exposed interior surface of the other of ball sections;
   e. said friction evice including spring means urging said pad towards engagement with said exposed interior surface with force sufficient to provide a yielding restraint against movement between said ball sections;
   f. means accommodated entirely within the ball sections for adjusting the force exerted by said spring means thereby to adjust the force resisting relative movement of said ball sections; and
   g. stems rigidly attached to said ball sections rsepectively and held in angularly adjusted relationship to each other by said friction device;
   h. one of said ball sections having one or more openings to provide access for a tool or the like for operating said adjusting means.

2. The ball joint as set forth in claim 1 in which said outer ball section comprises a hemisphere and an axial extension thereof, together with a retaining O-ring located inside the end of said axial extension and contacting said inner ball section, a snap ring holding said O-ring in said axial extension and in contact with said inner ball section thereby maintaining the inner ball section seated in the hemispherical section of said outer ball section.

3. The ball joint as set forth in claim 1 in which said friction device and sprign means comprise a flexible elastomeric element stressed by said adjusting means to a selected degree thereby to impose a desired frictional restraint against movement of said ball sections.

4. The ball joint as set forth in claim 1 in which said adjusting means comprises a carriage engaging said friction device and slidably mounted in said inner ball section; and screw means inside the inner ball section for engaging the carriage and operable to compress the spring means to a desired degree thereby to adjust the force resisting relative movement of said ball sections; said inner ball section having at least one opening to provide access for a tool or the like for operating said screw means.

5. In a ball joint:
 a. an outer hollow ball section comprising a major segment of a sphere;
 b. an inner hollow ball section comprising a major segment of a sphere and confined within the outer ball section for relative movement therein about a common center; said inner ball section having an opening exposing a minor segment of the interior surface of said outer ball section;
 c. a stem rigidly attached to one of the ball sections and projecting through the onpeing of said inner ball section;
 d. a friction pad mounted on the stem and confined thereby to move towards the exposed interior surface of one of said ball sections;
 e. a spring surrounding the stem and urging said pad towards engagement;
 f. means accommodated within the ball for adjusting the force exerted by said spring thereby to adjust the force resisting relative movement of said ball sections;
 g. one of said ball sections having one or more openings to provide access for a tool or the like for operating said adjusting means.

6. In a ball joint:
 a. an outer hollow ball section comprising a major segment of a sphere;
 b. an inner hollow ball section comprising a major segment of a sphere and confined within the outer ball section for relative movement therein; said inner ball section having an opening exposing a minor segment of the interior surface of said outer ball section;
 c. a stem rigidly attached to one of the ball sections and projecting through the onpeing of said inner ball section;
 d. a friction pad mounte don the end fo said stem and confined thereby to move towards the said minor segment of said interior surface of said outer ball section;
 e. a carriage supported on said stem for axial movement;
 f. a resilient sleeve surrounding the stem and interposed between said pad and said carriage;
 g. a series of screws mounte dinside the inner ball section for engaging the carriage thereby to compress the spring to a desired degree therby to adjust the force resisting relative movement of said ball sections;
 h. said inner ball section having one or more openings to provide access for a tool or the like for operating said screws.

* * * * *